(12) United States Patent
Gabello et al.

(10) Patent No.: US 8,392,129 B2
(45) Date of Patent: Mar. 5, 2013

(54) METHOD FOR MANAGING A FAULT EVENT IN A NETWORK FOR DISTRIBUTING ELECTRICAL ENERGY, AND A CORRESPONDING ELECTRONIC PROTECTION UNIT

(75) Inventors: Antonio Maria Gabello, Bergamo (IT); Massimo Pozzi, Romano di Lombardia (IT)

(73) Assignee: ABB S.p.A., Milan (IT)

( * ) Notice: Subject to any disclaimer, the term of this patent is extended or adjusted under 35 U.S.C. 154(b) by 396 days.

(21) Appl. No.: 12/672,024

(22) PCT Filed: Jul. 7, 2008

(86) PCT No.: PCT/EP2008/058779
§ 371 (c)(1),
(2), (4) Date: Feb. 3, 2010

(87) PCT Pub. No.: WO2009/019096
PCT Pub. Date: Feb. 12, 2009

(65) Prior Publication Data
US 2011/0080680 A1    Apr. 7, 2011

(30) Foreign Application Priority Data
Aug. 7, 2007   (IT) .............................. MI2007A1642

(51) Int. Cl.
*G01R 31/00* (2006.01)
*G01R 31/08* (2006.01)
*G05D 3/12* (2006.01)

(52) U.S. Cl. ............................ 702/58; 324/512; 700/292

(58) Field of Classification Search .................... 702/58, 702/57, 59–60, 64–67, 71–73, 75, 81, 84, 702/127, 182–183, 185, 189–190, 193; 324/76.11–76.12, 500, 509, 512, 522, 555; 361/187, 189–190; 700/286, 292–293, 297; 714/25, 47.1–47.3, 48
See application file for complete search history.

(56) References Cited

U.S. PATENT DOCUMENTS

| | | | |
|---|---|---|---|
| 6,313,639 B1 * | 11/2001 | Griepentrog | 324/500 |
| 6,437,576 B2 * | 8/2002 | Lorito | 324/509 |
| 6,844,737 B2 * | 1/2005 | Leprettre et al. | 324/511 |
| 2003/0169548 A1 * | 9/2003 | Clarey et al. | 361/78 |

FOREIGN PATENT DOCUMENTS

WO    WO 2006108860 A1 *    10/2006

* cited by examiner

*Primary Examiner* — Toan Le
(74) *Attorney, Agent, or Firm* — Paul R. Katterle; Melissa J. Szczepanik (57) ABSTRACT

A method is provided for managing a fault event in a network for distributing low-voltage or high-voltage electrical energy, which comprises at least one voltage source and a load. The method includes performing at least one step of a first procedure for detecting the existence of fault conditions in the load and performing at least one step of a second procedure for determining, on the basis of the evolution in time of the derivative of the instantaneous current in the load, the state of execution of an interruption manoeuvre started by at least one protection device adapted to interrupt locally the passage of current in the load. An electronic protection unit is also provided that is able to execute the aforesaid method.

16 Claims, 8 Drawing Sheets

023# METHOD FOR MANAGING A FAULT EVENT IN A NETWORK FOR DISTRIBUTING ELECTRICAL ENERGY, AND A CORRESPONDING ELECTRONIC PROTECTION UNIT

BACKGROUND OF THE INVENTION

The present invention relates to the field of networks for distributing electrical energy. In particular, the present invention relates to a method for managing a fault event in a network for distributing low-voltage or high-voltage electrical energy. In a further aspect thereof, the present invention regards an electronic protection unit capable of executing the aforesaid method.

Currently, in networks for distributing low-voltage or high-voltage electrical energy, protection devices are used to which the function of preserving the network from the consequences of a fault event is devolved.

In many cases, said protection devices comprise electromechanical switches of a traditional type in which the function of protection from the fault event is entrusted to the onset of phenomena of electrodynamic repulsion at the level of the electrical closing/opening contacts. Traditionally, the electrical contacts of said switches are, in fact, shaped in such a way that the currents circulating therein flow in mutually opposite directions. The passage of possible currents in the contacts thus determines onset of forces that tend to separate them. In normal operating conditions, said forces of electrodynamic repulsion are, for the most part, of a negligible intensity. In the presence of particularly intense short-circuit currents, said repulsive forces are instead able to complete the separation of the electrical contacts.

Other more advanced protection devices comprise circuit breakers provided with an electronic protection unit for activating, in the event of fault, a kinematic chain that determines separation of the contacts of the circuit breaker.

It is known how, in managing a fault event, the obtaining of a marked tripping selectivity by the aforesaid protection devices assumes particular importance.

By the term "tripping selectivity", or, more briefly, "selectivity", is meant the capacity of a system for isolating from the supply relatively circumscribed portions of network in the vicinity of the origin of the fault.

In other words, the term "selectivity" indicates the capacity of tripping in a co-ordinated and circumstantiated way for reducing the lack of service and inconvenience in the event of fault, limiting it just to the portions of network that are effectively at risk and preserving, at the same time, the state of service of the rest of the system.

On the other hand, it is known that obtaining a high level of selectivity is a particularly critical aspect in system design. It is necessary, in fact, to reconcile the requirements of greater tripping reliability with the obvious need to contain the costs of installation and management of the electrical network.

In more traditional electrical networks, a certain level of selectivity is obtained by distributing the protection devices on hierarchical levels differentiated from the energy standpoint (the levels further upstream, i.e., closer to the voltage source, are traditionally considered of higher hierarchy) and selecting the tripping characteristics of each protection device according to the hierarchical level occupied.

Given that each branch of the network is sized to carry, in conditions of safety, electric power sufficient for supplying all the lower levels that propagate therefrom, selectivity is obtained by exploiting the differentiation of the tripping parameters (tripping current, tripping times, mechanical inertia of the contacts, etc.) that exists between protection devices belonging to different hierarchical levels.

In this way, the inconvenience due to a fault event involves only the portion of network regulated by the fault device having a hierarchical level immediately higher than the level or the position in which the fault itself has occurred.

Practice has shown that solutions of this type present certain drawbacks, linked, for the most part, to the fact of not being able to ensure a level of selectivity that is high and constant over time.

In fact, the level of selectivity that can be obtained is strictly correlated to the nominal conditions of operation of the protection devices. It has been shown that, frequently, the performance of the electrical network, in terms of tripping selectivity, can decay considerably, in relation to the state of wear of the components of the protection devices and the consequent variation of the corresponding tripping parameters.

Other more advanced technical solutions of a known type, such as the ones described in the European patents EP838887 and EP856739 and in the U.S. Pat. No. 6,313,639, envisage the use of protection devices, referred to as protection devices of an EFDP (Early Fault Detection Prevention) type, capable of communicating with one another to co-ordinate the respective modalities of tripping, in the case of a fault event.

An EFDP device comprises sensors and corresponding electronic means for acquiring samples of data indicating the instantaneous current and the derivative of the instantaneous current circulating in the equivalent load, corresponding to the portion of network controlled by the device itself.

Said data samples are sent at input to a protection unit and compared with a table of predefined data, corresponding to normal operating conditions. If a number of consecutive data samples do not fall within the set of data corresponding to normal operating conditions, the protection unit of an EFDP device generates an interblock signal.

Said interblock signal is sent to all the other EFDP devices of the network located upstream, causing inhibition of their capacity of tripping.

If the EFDP device in question is not in turn interblocked by another EFDP device set further downstream, it trips directly, thus interrupting the current.

For the above purpose, the protection unit of the EFDP device generates an appropriate opening-command signal, for activating the kinematic chain that determines separation of the electrical contacts.

It is evident how, thanks to the co-ordination of the tripping modalities, in a network comprising EFDP devices levels of selectivity can be obtained that are much higher than those of the more traditional solutions described above.

Albeit meeting the purposes for which they have been devised, also these technical solutions present certain disadvantages.

Said drawbacks basically derive from the fact that obtaining a high selectivity is strictly correlated to the presence of EFDP devices at each node of the network. For the portions of network not presided over by EFDP devices (or, in any case, not communicating with the rest of the electrical network), the level of selectivity remains still linked to the mere differentiation of the tripping parameters, as in more traditional technical solutions.

On the other hand, the use of EFDP devices alone for creating the entire electrical network proves somewhat expensive and laborious.

In order to overcome the above drawbacks, further technical solutions of a known type envisage provision of the EFDP devices installed with a function referred to as "Trip Delay".

According to said operating mode, after execution of the algorithm described above, an EFDP device waits, for a predefined time interval (for example, 3.5 ms), before intervening directly and interrupting the current.

In this way, it is possible for any other protection device, positioned downstream of the aforesaid EFDP device, to trip, if it is able to do so.

If (and only if) at the end of the aforementioned wait interval, there still exist the fault conditions detected, the EFDP device trips directly, thus interrupting the current.

Is has been noted that, even though this type of solution enables a greater selectivity for more extensive portions of network, it presents the drawback of requiring minimum tripping times (comprised between the 10-20 ms) that are relatively long.

Said tripping times are, at times, unacceptable if it is desired to guarantee a reliable operation over time of the electrical network. For example, if downstream of a certain EFDP device no further EFDP devices are present and the fault occurs at a portion of system comprised between the aforesaid EFDP device and any protection device (not of an EFDP type) set downstream, said portion of system remains exposed to the flow of the fault currents for a time equal to the minimum tripping time of the EFDP device. Given that said fault currents, in particular the short-circuit currents, assume particularly high values (for example, 200 kA), there may occur an early ageing of the parts making up the aforesaid portion of system, jeopardizing proper operation thereof, even in normal conditions.

The U.S. Pat. No. 6,844,737 describes an EFDP device provided with some functionalities aimed at improving the level of selectivity, ensuring, however, relatively reduced tripping times, where necessary.

Said functionalities are based upon the calculation of a quotient between the differential corresponding to two successive samples of current derivative and current, as soon as there has been ascertained a departure from conditions of normality of the evolution of the current in the load.

Practice has, however, shown that said solution, albeit offering a sort of forecast regarding the possible evolution of the fault current, can provide indications that are only partial and not always reliable. For example, for topologically complex portions of network, said method does not make it possible to know whether a protection device downstream of the EFDP is already tripping with a reasonable likelihood of success.

SUMMARY OF THE INVENTION

The present invention provides a method for managing a fault event in a network for distributing electrical energy that will enable the drawbacks of the known art to be overcome.

In the framework of the foregoing, the present invention provides a method for managing a fault event, as well as a corresponding electronic protection unit, that will enable a greater tripping selectivity to be obtained so as to optimize the tripping times and minimize the energy that develops during the fault phenomenon.

A further aspect of the present invention is to provide a method for managing a fault event, as well as a corresponding electronic protection unit, that will enable, in the shortest time possible, detection of the fault event and determination of the modalities of tripping most efficient for ensuring a limitation of the damage for the system both in terms of degradation and in terms of lack of service and inconvenience.

A further aspect of the present invention is to provide a method for managing a fault event, as well as a corresponding electronic protection unit, that will be relatively simple to implement practically, at relatively contained costs.

The method according to the invention detects the existence of fault conditions in the load. Once the possible presence of a fault has been ascertained, the method according to the invention carries out a procedure to determine, on the basis of the evolution in time of the derivative of instantaneous current of the load, whether at least one protection device, designed to interrupt the current in the load locally, is able to complete successfully an interruption manoeuvre undertaken in response to the aforesaid fault conditions.

Analysis of the evolution of the time derivative makes it possible to foresee with a considerable margin of certainty whether the manoeuvre started by the aforesaid protection device may be brought to a successful conclusion or else is bound to fail.

On the basis of the results of said preventive analysis, the method according to the invention predicts the tripping modes most suitable for the developing situation.

In the case where the load comprises a number of protection devices capable of tripping, the method according to the invention preferably enables identification of the protection devices that are performing the interruption manoeuvre.

As will be seen more clearly hereinafter, the method according to the invention is readily implementable, at relatively contained costs, by an electronic protection unit that can possibly be conveniently integrated in the protection unit of a circuit breaker.

The method according to the invention hence enables combination of a considerable operating rapidity with a high tripping selectivity, with consequent considerable reduction in the extent of network failure and inconvenience and in the energies generated during the fault event.

For the above reason, as will be illustrated more clearly hereinafter, it is particularly suitable for improving management of a fault event in a network for distributing electrical energy that comprises a plurality of EFDP devices, divided over a plurality of hierarchical levels. In this sense, the method according to the present invention enables a considerable upgrading in the functions already present in the EFDP devices of the aforesaid distribution network.

BRIEF DESCRIPTION OF THE DRAWINGS

Further characteristics and advantages of the present invention may be more readily appreciated with reference to the ensuing description and to the attached figures, which are provided purely by way of non-limiting illustration and in which.

DETAILED DESCRIPTION OF ILLUSTRATIVE EMBODIMENTS

With reference to the aforesaid figures, the present invention relates to a method 1 for managing a fault event in a network 100 for the distribution of high-voltage or low-voltage electrical energy, and to a corresponding electronic protection unit 51.

The distribution network 100 (FIGS. 4A-4B) comprises at least one voltage source 101 and a load 102.

By the term "load" is meant the portion of network managed by the method 1. In other words, by the term "load" is meant the portion of network seen downstream of the electronic unit 51 during execution of the method 1.

The load 102 can have any extension and configuration and can comprise any stretch of electrical network 100, with any final electrical-energy-using device (or other equivalent load) L1-L6.

The load 102 comprises at least one protection device 103, designed to interrupt the passage of current in the load 102 itself locally.

Figure 1:
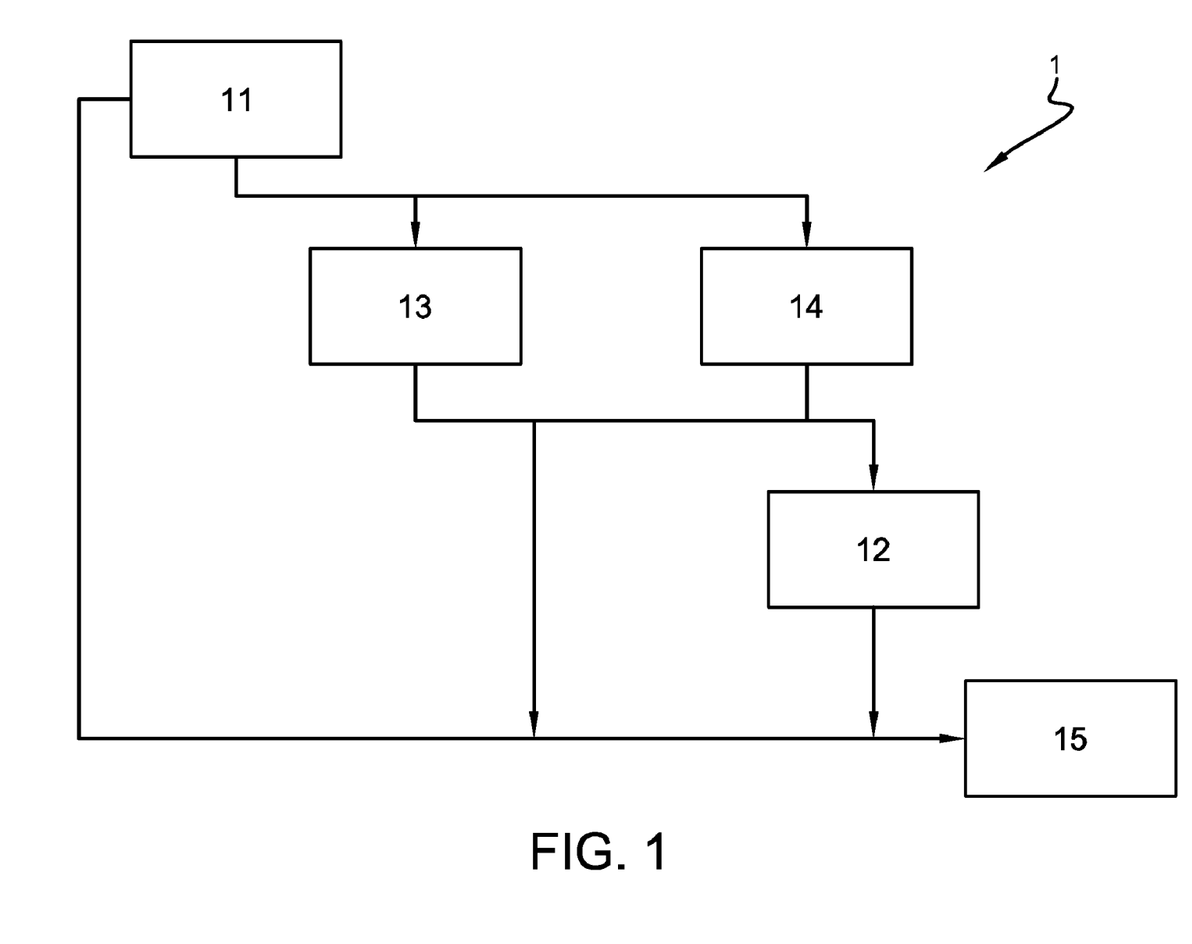
FIG. 1 is a block diagram that is a schematic illustration of the steps of the method for managing a fault event according to the present invention.

The method 1 comprises a step 11 for executing a first procedure for detecting the existence of fault conditions in the load 102.

Preferably, the aforesaid first procedure envisages a succession of steps substantially similar to the one generally executed by a protection device of an EFDP type during the activity of monitoring of a portion of electrical network.

It thus comprises a step a') of acquisition of data 202 and 203, respectively indicating the instantaneous current and its derivative in the load 102.

This is followed by a step b') of comparison of the data 202 and 203 acquired in step a') with a first set of predefined data indicating the instantaneous current in the load 102 and its derivative in normal operating conditions of the load 102.

Figure 2A:
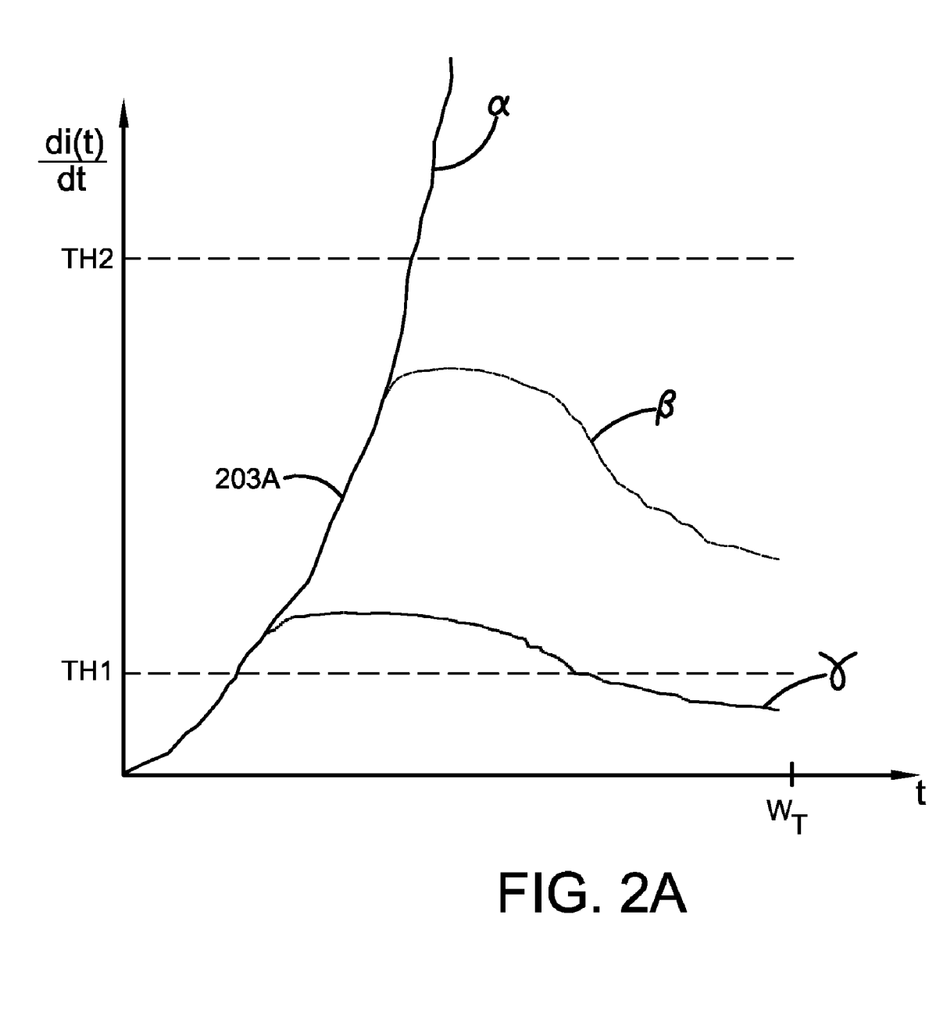
FIG. 2A is a schematic illustration of some examples of time plots of the current derivative in the load, used in the method according to the present invention.
Figure 2B:
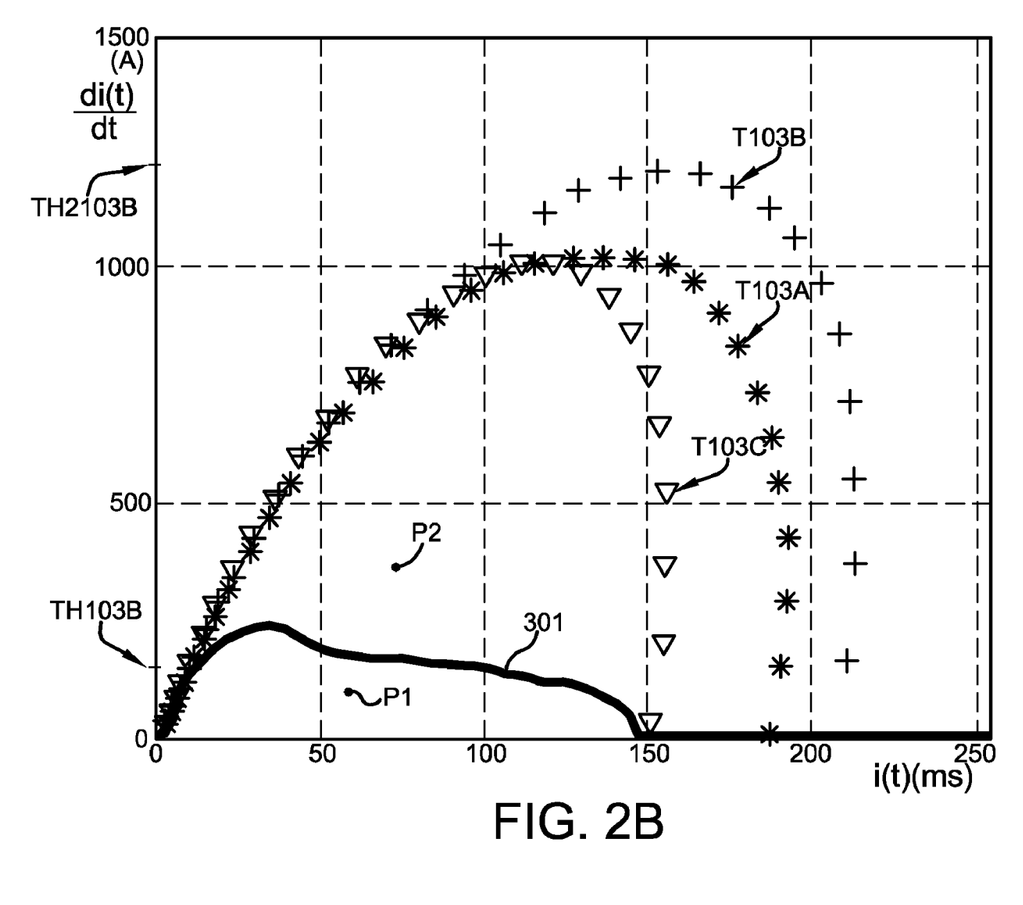
FIG. 2B is a schematic illustration of some examples of trajectories of electrodynamic repulsion, used in the method according to the present invention.

With reference to FIG. 2B, in step a') pairs of data [i(t), di(t)/dt] are acquired, each of which identifies any point P in the plane i(t)–di(t)/dt. The aforementioned first predefined set of data identifies in the plane i(t)–di(t)/dt an area 301 that defines the locus of the points P indicating a situation of normal operation of the load 102.

During step b'), a check is made to verify whether the data 202 and 203 acquired identify a point P of the plane i(t)–di(t)/dt comprised in the aforesaid area 301.

In the case where at least one sample of data acquired in step a') is not comprised in the aforesaid first set of data and thus identifies a point P2 external to the area 301 (FIG. 2B), the first procedure comprises a step c') of generation of a "trigger" signal (i.e., an activation signal) indicating the existence of abnormal conditions.

In the case where this does not occur (point P1 of FIG. 2B), the first procedure envisages, as an alternative to step c'), a step d') of repetition of at least the steps a') and b') for a further sampling of data 202 and 203.

In the practical implementation of the method 1, the aforesaid first procedure is hence, preferably, constantly active so as to monitor operation of the load 102 continuously and generate a trigger signal when fault conditions are detected. Said trigger signal determines activation of the steps of the method 1 that must be executed following upon step 11.

Once the fault conditions have been detected, the method 1 can advantageously envisage a step 13 of generation of an interblock signal $IB_{OUT}$ (FIGS. 3 and 4C) for one or more protection devices present in the network. Conversely, the method 1 could also preferably envisage a step 14 of verification to check whether there exist interblock conditions, i.e., whether an interblock signal $IB_{IN}$ (FIGS. 3 and 4C) coming from one or more protection devices present in the network has been received at input.

Figure 4A:
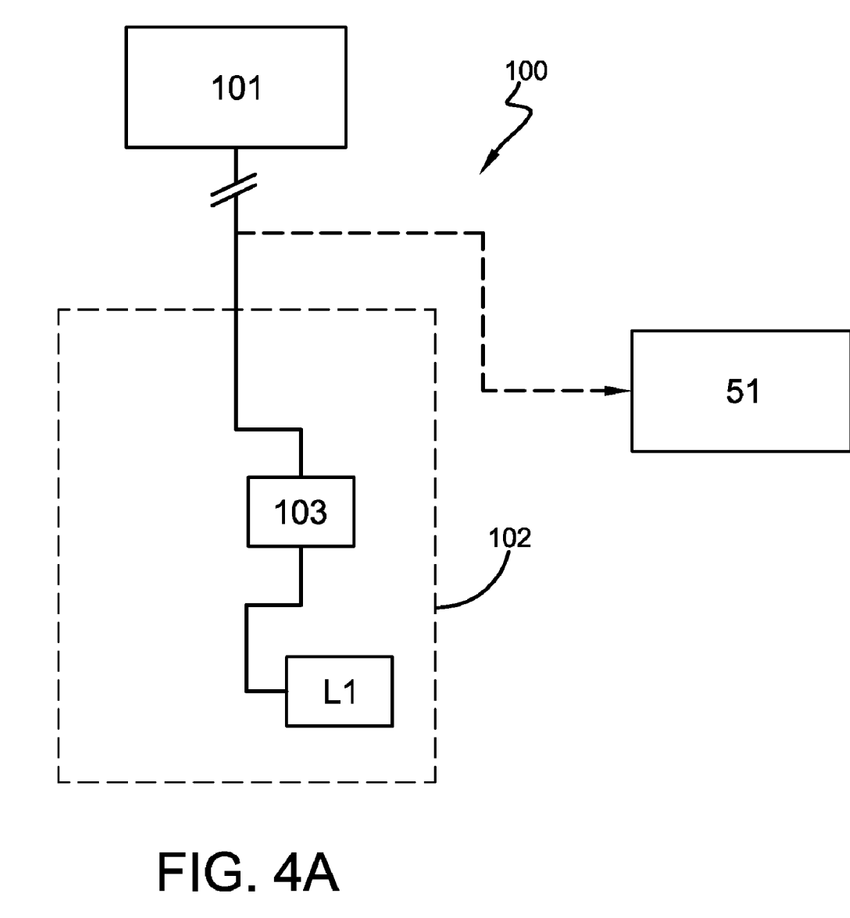
FIGS. 4A-4C is a schematic illustration of examples of a network for distributing electrical energy, comprising an electronic protection unit according to the present invention.
Figure 4B:
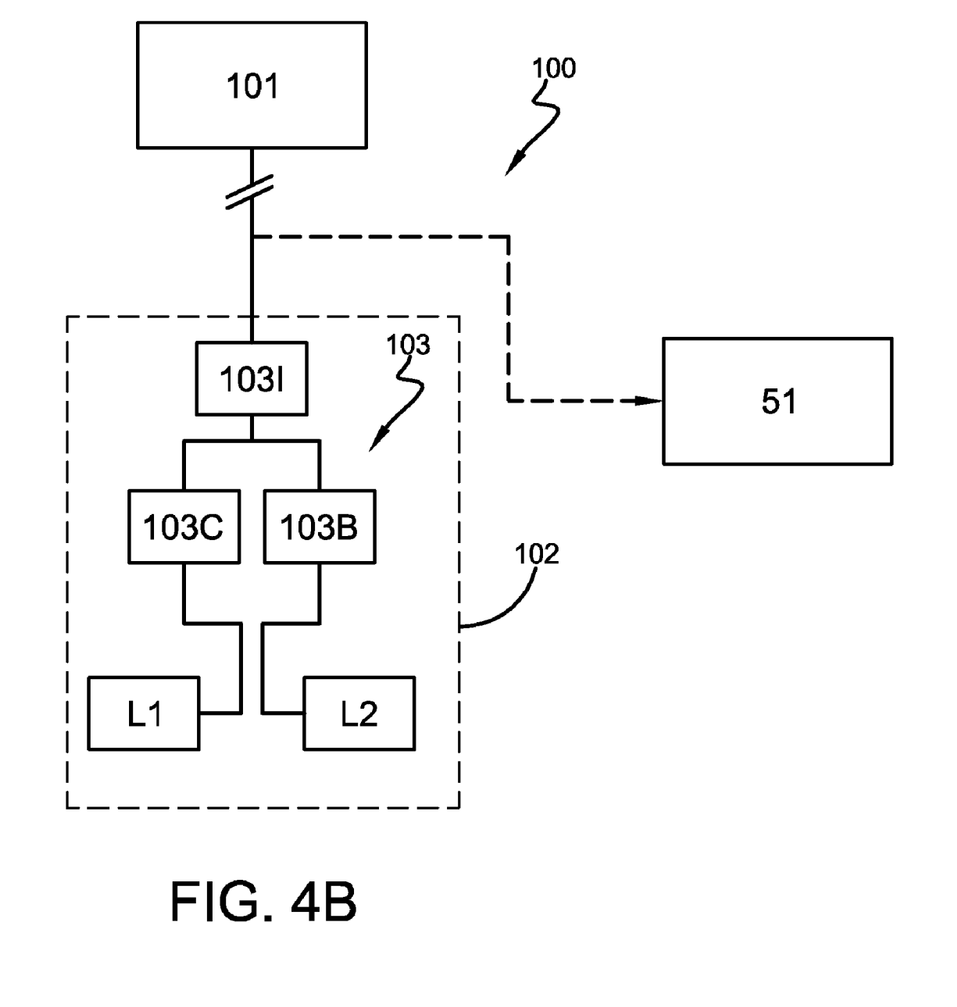
Figure 4C:
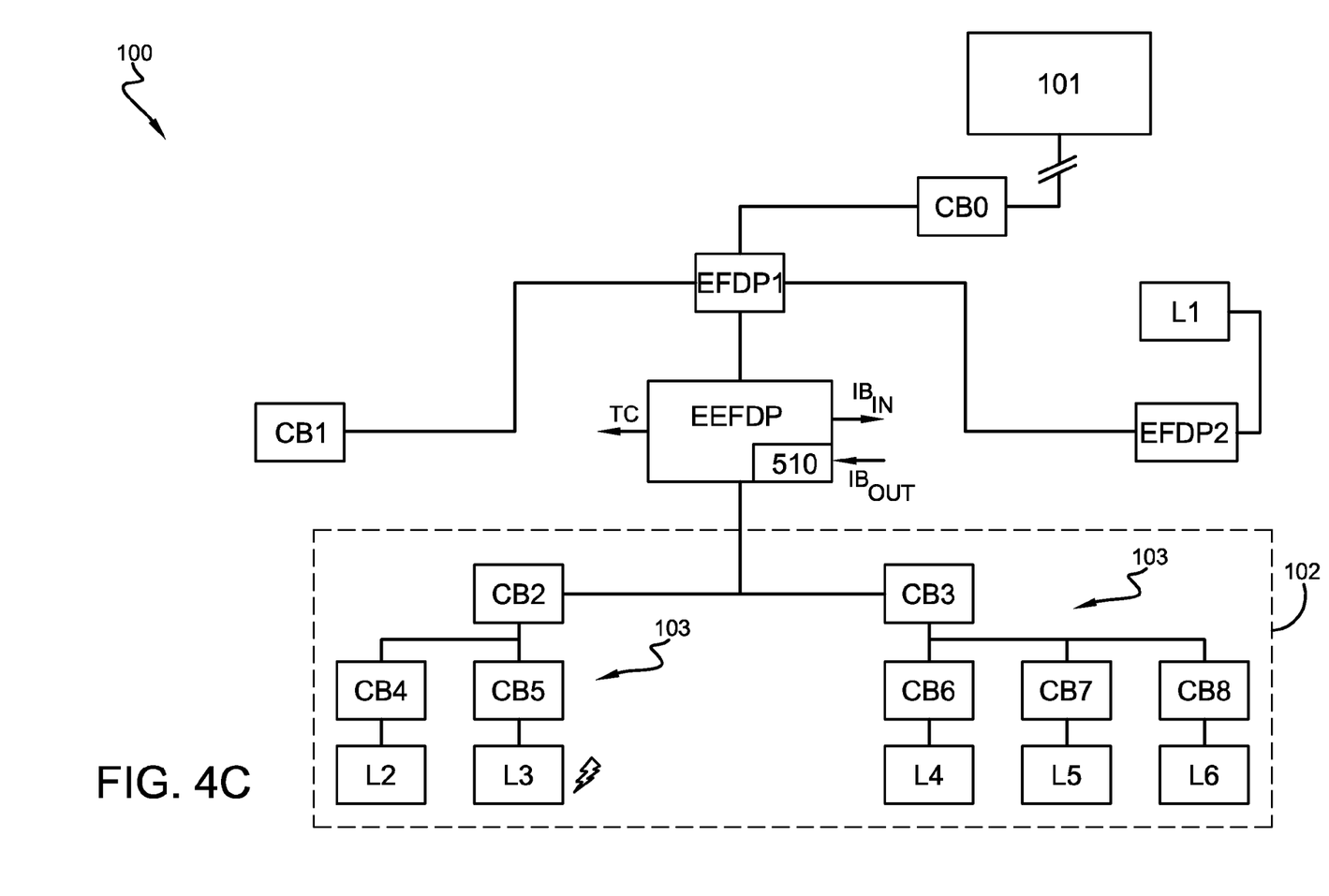

Following upon the possible steps 13 and 14, illustrated above, and a possible step 12, which will be described more fully hereinafter, the method 1 comprises the step 15 of execution of a second procedure, designed to determine, on the basis of the evolution in time of the derivative of the instantaneous current in the load 102, the state of execution of an interruption manoeuvre started by one of the protection devices 103 (FIGS. 4A-C).

With reference to FIG. 2A, the second procedure analyses the evolution of the instantaneous current derivative di(t)/dt in a certain time window $W_T$, predefined on the basis of the parameters of interruption of the device 103.

If the time evolution of di(t)/dt indicates an uncontrolled evolution of the fault current (curve α of FIG. 2A), the second procedure envisages generation of a tripping signal (TC), which is to be sent to a protection device upstream (i.e., at a higher hierarchical level) of the protection device 103.

Otherwise, if the time evolution of di(t)/dt indicates that the fault current is evolving in a controlled way (curves β and γ of FIG. 2A), the second procedure envisages prosecution of monitoring (curve β) or even termination of monitoring of di(t)/dt (curve γ).

The use of a predefined time window $W_T$ for observation of the evolution of di(t)/dt on the load 102 makes it possible to obtain a sufficient amount of information to assess with a reasonable degree of certainty the evolution of the fault current and, hence, the likelihood of success of the tripping manoeuvre by the device 103.

The second procedure thus comprises a first step a") of acquisition of data 203A indicating the evolution in time of the derivative of instantaneous current in the load.

Next, there is envisaged a step b") of comparison of the data acquired in step a") with lower and upper threshold values (TH1 and TH2, respectively) that are characteristic of the protection device 103.

The threshold values TH1 and TH2 are pre-definable on the basis of the tripping parameters of the device 103 and/or of particular requirements of management of the distribution network 100. For instance, the upper threshold value TH2 could be varied for modulating, according to the requirements, the overall tripping times in response to a fault in the load 102.

At this point, the second procedure envisages some steps that are alternative to one another to be carried out on the basis of the results of the comparison made during step b").

In the case where the current derivative exceeds in time the upper threshold value TH2, there is envisaged a step c") of termination of the procedure and generation of an opening-command signal TC for a protection device set upstream. In fact, if the current derivative increases beyond the threshold TH2 (curve α of FIG. 2A), the evolution of the current in the load 102 cannot be in conformance with the trajectory of electrodynamic repulsion that is characteristic of the device 103. This means that the protection device 103 is not able to complete the manoeuvre, for example on account of a deterioration of the contacts caused by the fault current. There is consequently generated an opening-command signal TC for causing tripping of a protection device of higher hierarchical level (for example, the device CB0 of FIG. 4C) with respect to the protection device 103 that is trying to trip in such a way that it is likely to be able to complete interruption of the fault current in the load 102.

If the current derivative assumes in time values lower than the lower threshold value TH1, the second procedure envisages its own termination. There is thus a return to a situation in which the portions of load 102 that are still active continue to be monitored by means of the first procedure 11. The condition just described indicates in fact that the protection device 103 is able to complete successfully the tripping manoeuvre undertaken given that the current in the load is again assuming values of normal operation. It is hence possible to return to monitoring portions of load not affected by the fault.

Current-derivative data in an intermediate position between the thresholds TH1 and TH2 mean that the protection device 103 is still carrying out the interruption manoeuvre, without at the same time there having occurred any phenomena that might be harmful for operation of the device. The second procedure thus envisages continuation of monitoring of the manoeuvre of the device 103. There is thus envisaged a step e") of repetition of at least the steps a") and b") for a further sample of input data 203A.

According to another embodiment, the second procedure of step 15 can envisage the observation of the evolution of the current derivative di(t)/dt in relation to the upper threshold value TH2 alone.

If di(t)/dt assumes values higher than the threshold TH2, there is generated an opening-command signal TC for a protection device upstream of the device 103. Otherwise, monitoring of the time evolution of di(t)/dt is continued up to completion of the opening manoeuvre by the device 103.

In the case where the load 102 comprises a single protection device 103 (FIG. 4A), the selection of the threshold parameters can occur in a unique way, there not being any possibility of confusion as regards the identity of the protection device that is tripping.

In the case where the load 102 comprises a number of protection devices capable of tripping (FIGS. 4B-C), proper selection of the threshold parameters may obviously be more laborious, it being advantageously preferable to identify the protection device 103 that is tripping.

For this purpose, the method 1 comprises a step 12 of execution of a third procedure designed to identify at least one protection device 103 that has started a manoeuvre for interruption of the current in the load 102.

Given that said procedure is used for carrying out a proper selection of the characteristic threshold values TH2 and (possibly) TH1 used by the second procedure illustrated above, step 12 is advantageously carried out before execution of step 15.

In a preferred embodiment, the aforesaid third procedure comprises a first step a''') of acquisition of data 202 and 203 indicating at least the instantaneous current in the load 102 and its derivative.

The second procedure envisages then a step b''') of comparison of the data 202 and 203 acquired in step a''') with one or more second sets of predefined data indicating the evolution of the derivative of the instantaneous current in the load 102 during a manoeuvre for interruption of the current by at least one protection device 103.

Preferably, said second sets of data correspond to one or more mappings of the characteristic trajectories of electrodynamic repulsion of one or more protection devices 103A-103C that are designed to interrupt the passage of current in the load 102. Said characteristics of electrodynamic repulsion are curves indicating the evolution on the load 102 of the current derivative di(t)/dt as a function of the current i(t). Each of said mappings may advantageously comprise one or more characteristic curves $T_{103A}$-$T_{103C}$ (FIG. 2B), each of which is advantageously calculated on the basis of a predefined operating condition, for example on the basis of the short-circuit current and/or the operating voltage.

The use of said characteristic curves is founded upon the observation whereby a number of protection devices, subjected to identical fault currents, behave in a distinct way during execution of the manoeuvre for interruption of the current on account of the different combinations of dimensional, electromagnetic, mechanical, and morphological characteristics that are typical of each protection device. Said differences of behaviour are particularly recognizable during electrodynamic repulsion of the contacts. The trajectories of electrodynamic repulsion, represented in the plane i(t)–di(t)/dt, consequently characterize, in a substantially unique way, the protection device that is performing the manoeuvre for interruption of the current.

During step b'''), a check is made to verify on which of the aforesaid curves $T_{103A}$-$T_{103C}$ the points of the plane i(t)–di(t)/dt, identified by the data i(t), di(t)/dt acquired in the preceding step a'''), lie. If, for example, said points are located along the characteristic curve $T_{103B}$ (or in the area subtended by said curve), this means that it is precisely the protection device 103B that is tripping to interrupt the current in the load 102.

The aforesaid second procedure then envisage step c''') of identification of the protection device 103B that is tripping to interrupt the current in the load 102 on the basis of the result of the comparison made in step b''').

Once a protection device, for example the device 103B, that is carrying out interruption of the current to the load has been identified, selection is made of the respective threshold parameters corresponding to the current derivative, to be used in the next step 15.

There is then envisaged a step d''') of selection of an upper threshold value of current derivative $I2_{103B}$ and possibly a step e''') of selection of a lower threshold value of current derivative $I1_{103B}$, said threshold values being predefined and characteristic of the protection device 103B identified in step c''').

The selection described above could be made between families of threshold values $I1_{103B}$, $I2_{103B}$ that are characteristic of the protection device 103B. Each family could be parameterized on the basis of the requirements of tripping of the distribution network 1.

Once the threshold parameters $I1_{103B}$ and $I2_{103B}$ have been selected, the aforementioned third procedure can terminate. Step 15 illustrated above can start, and the corresponding second procedure, in one of the embodiments described, can be executed without any ambiguity.

As has been mentioned above, in a further aspect thereof, the present invention also relates to an electronic protection unit 51 for a network for distributing low-voltage or high-voltage electrical energy.

Figure 3:
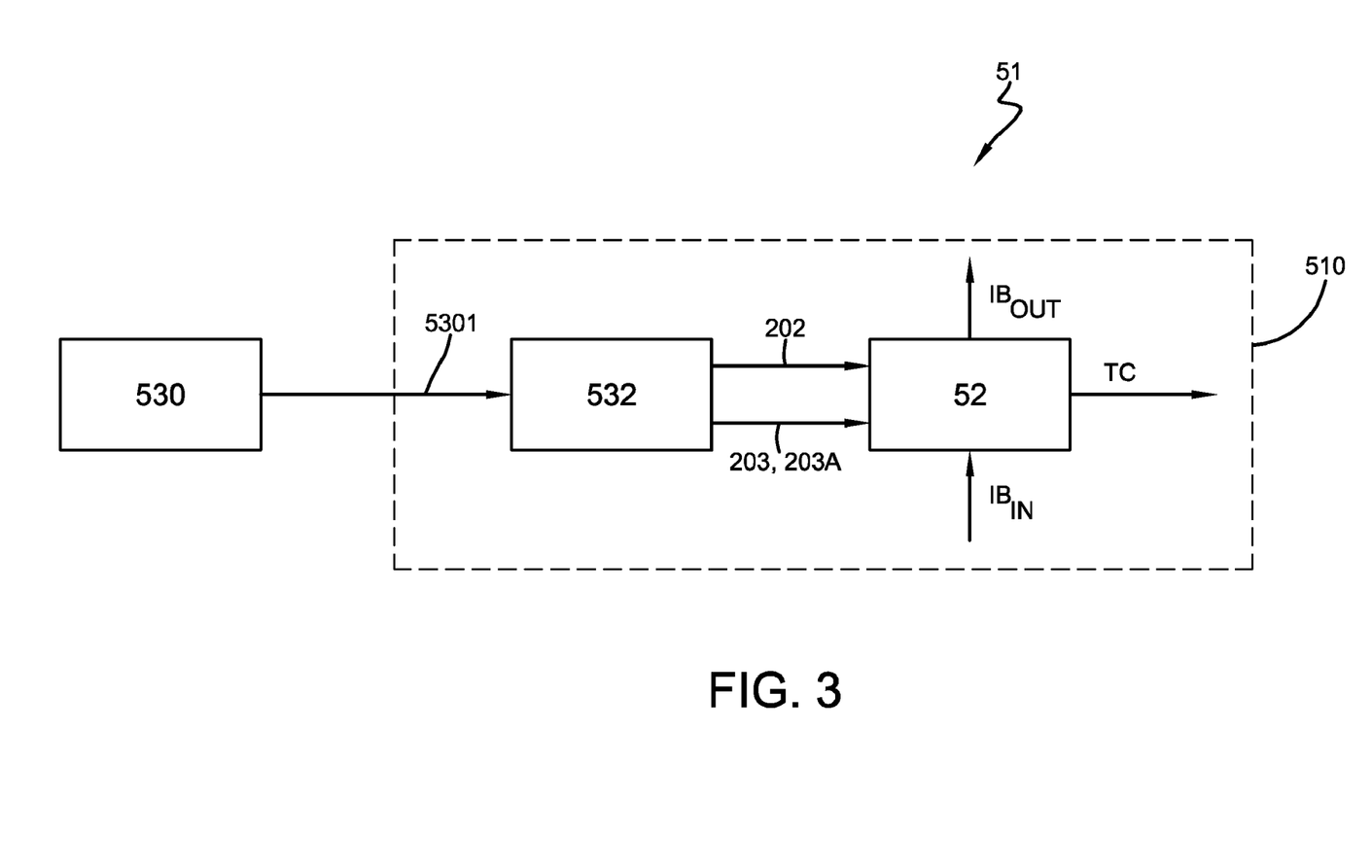
FIG. 3 is a schematic illustration of the structure of an electronic protection unit designed for executing the method according to the present invention.

The peculiarity of the electronic device 51 is that of comprising a processing unit 510, preferably including at least one microprocessor.

The processing unit 510 comprises computerized means 52 designed to execute the method 1 illustrated above.

The computerized means 52 are advantageously able to store the predefined data used in the procedures of the method 1, such as, for example, the aforementioned first and second sets of predefined data or characteristic threshold values. Said predefined data could be each time updated to take into account the inevitable modifications to the behaviour of the protection devices following upon each fault event. Said updatings can be introduced periodically by entry of data by an operator or else automatically by means of appropriate self-learning procedures.

Alternatively, said predefined data could be sent each time at input to the computerized means 52.

The computerized means 52 may advantageously be able to receive external interblock signals $IB_{IN}$ from other protection devices and/or generate interblock signals $IB_{OUT}$ or opening commands TC to be sent to other protection devices.

The computerized means 52 can moreover be programmed to take into account the non-linearities and delays introduced by the components of the electronic device 51.

The electronic unit 51 preferably comprises sensor means 530 for acquiring data indicating the instantaneous current in the load and/or its derivative. The aforesaid sensor means can comprise sensors of a known type, such as amperometric transformers, Rogowski coils, resistive shunts, and/or Hall sensors, and/or other sensors of an alternative type available on the market.

According to a preferred embodiment, the processing unit 510 comprises second computerized means 532 for digital processing of the signals 5301 coming from the sensor means 530.

The second computerized means 532 can advantageously carry out an analog-to-digital conversion, filtering, and sampling of the input signals 5301.

If necessary, the second computerized means 532 can carry out operations of integration or differentiation of the signals 5301 so as to make always available at input to the first computerized means 52 samples of data 202 and/or 203-203A indicating the instantaneous current and its derivative in the load 102.

According to alternative embodiments (not illustrated), processing of the signals 5301 could instead be performed by appropriate electronic means, which are located downstream of the sensor means 530 and comprise integrated or discrete electronic circuits.

The electronic unit 51 can be used autonomously for managing fault events in a network for distributing electrical energy. In this case, said unit can be installed in the network like any protection device.

Figure 5:
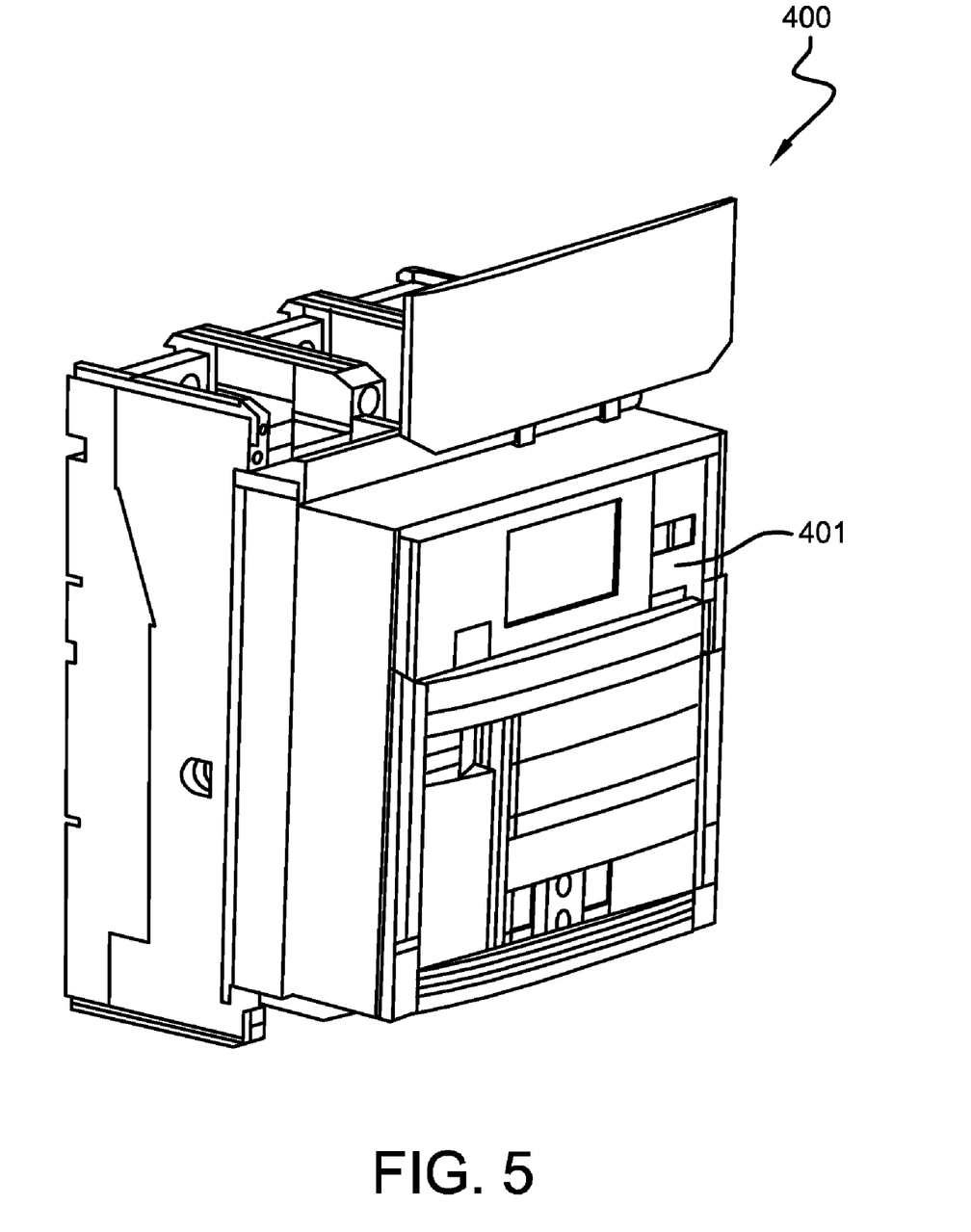
FIG. 5 is a schematic illustration of a protective circuit breaker that comprises the electronic device of FIG. 3.

Advantageously, however, the electronic unit 51 can be completely integrated in a relay 401 of a protection device 400, used in networks for distributing electrical energy (FIG. 5). For this purpose, for the electronic unit 51, hardware and software resources made available on board the relay 401 may be conveniently used. For example, the processing unit 510 can be functionally constituted by the processing unit on board the relay 401, which can advantageously comprise the computerized means 52 and 532.

One or more computer programs, designed to implement practically, by means of one or more software modules, the computerized means 52 and (possibly) 532, can be readily downloaded into the processing unit of the relay 401 by means of direct intervention on the part of the operator or else from a remote station.

The method 1 according to the present invention finds its natural and appropriate application in managing a fault event in a network for distribution of electrical energy that comprises protection devices of an EFDP type.

With reference to FIG. 4C, a network for distributing low-voltage or high-voltage electrical energy 100 is illustrated schematically, said network comprising a voltage source 101 and a plurality of protection devices distributed on a number of hierarchical levels.

Said protection devices can comprise, for example, a number of protection devices of an EFDP type (for example, the devices EFDP1-EFPD2) and protection devices of a more traditional type (for example, the devices CB0-CB8).

The network 100 could advantageously envisage a communication bus (not illustrated) for connecting the aforesaid protection devices together.

In the distribution network 100, at least one protection device of an EFDP type comprises a relay provided with a processing unit 510 or, more in general, a processing unit that is able to execute the method 1 according to the present invention.

Said protection device, in what follows defined as EEFDP (Enhanced EFDP) protection device, is able to manage a fault event in the portion of network immediately downstream, which thus constitutes the load 102 seen by the EEFDP device. As may be noted, the load 102 comprises, for example, the final loads (or other loads) L2-L6 and the protection devices CB2-CB8.

On the basis of the method 1 according to the present invention, in the case where there occurs a fault event (for example, corresponding to the load L3), the EEFDP protection device is able to determine the existence of fault conditions in the load 102, thanks to the action of continuous monitoring performed in step 11.

Once said fault conditions have been detected, the EEFDP protection device can advantageously verify whether an interblock signal $IB_{IN}$ has been received at input from possible protection devices of an EFDP type set further downstream.

If this is not the case, the protection device EEFPD advantageously generates an interblock signal $IB_{OUT}$ to be sent to the device EFDP1 (of higher hierarchical level).

If the existence of fault conditions has been ascertained, since a number of protection devices are present downstream the EEFDP protection device carries out the third procedure 15 for identifying which of the protection devices CB2-CB8 has started a manoeuvre for local interruption of the current in the load 102. It is to be noted that the identification of the protection device that is tripping enables identification of the portion of network in which the fault has occurred.

Once said protection device has been identified, for example the protection device CB5, the EEFDP protection device carries out the second procedure 12 to determine the state of execution of the interruption manoeuvre started by the protection device CB5.

In the case where it is ascertained that the aforesaid interruption manoeuvre can be effectively concluded successfully, the EEFDP device does not intervene any further and continues to monitor the portions of load not affected by the fault.

In the case where it is ascertained that the aforesaid interruption manoeuvre is going on regularly, the EEFDP device will continue to monitor the performance of the interruption manoeuvre with continuity, approximately every 50 μs, if the sampling frequency chosen for the EEFDP device is 20 kHz.

Finally, in the case where it is ascertained that the aforesaid interruption manoeuvre cannot be concluded successfully, the EEFDP device generates an opening-command signal TC.

The command signal TC is advantageously sent to a protection device set upstream with respect to the device CB5, for example the device CB2. Once the opening-command signal has been received, the device CB2 starts a manoeuvre for interruption of the current.

Advantageously, the EEFDP device sends the command signal TC to the protection device most suitable for completing the manoeuvre rapidly, i.e., to the protection device that presents the most adequate tripping parameters in relation to the extent of the fault. The selection of the aforesaid protection device can advantageously be made on the basis of the predefined data already stored on board the EEFDP device.

Advantageously, however, the EEFDP device could execute again the third procedure for controlling performance of the manoeuvre performed by the device CB2.

If need be, the EEFDP device can cause direct tripping also of the on-board switch by activating the control kinematic chain thereof by means of the command signal TC.

Alternatively, the command signal TC can be sent directly also to a protection device set upstream of the EEFDP device, for example to the device EFDP1 and/or to the protection device (not of an EFDP type) CB0.

It has been noted in practice that the method 1 according to the present invention and the corresponding electronic protection unit 51 enable the pre-set task and purposes to be achieved.

The state of execution of an interruption manoeuvre of the fault current on the load is assessed on the basis of the evolution in time of the derivative of the instantaneous current on the load itself as a function of appropriate threshold values.

It is possible to obtain high levels of tripping selectivity for each portion of the network for distributing electrical energy, with relatively reduced and optimized tripping times according to the extent and nature of the fault detected.

Said levels of selectivity may be obtained without exclusive recourse to factors of a predefined type (for example, of a chrono-amperometric type, energy type or temporal type) but only on the basis of the real conditions of the distribution network, even though said distribution network is a pre-existing network and does not comprise protection devices specifically pre-arranged for execution of the method 1.

Said levels of selectivity are moreover obtained without the need for specific wiring but simply by supplying the characteristic data of the protection devices of the load.

The foregoing leads to a considerable improvement in the modalities of management of the network.

Levels of selectivity that are relatively high and, above all, that can be extended potentially to each portion of network, even though not been previously pre-arranged therefore, enable an increase in the useful service life of the devices/components used, in particular the protection devices, with consequent reduction in the operating-management costs.

On the other hand, the method 1 enables a full exploitation of the potential of the components/devices used according to their operative state. It moreover enables information to be gathered on the residual service life of the devices/components used. For example, it is possible to infer the progressive deterioration of the protection devices of the network by comparing successive characteristic trajectories of electrodynamic repulsion or else by detecting variations in the capacity for correct response to a fault event.

The method 1 is characterized by a considerable operative flexibility that enables it to be readily adapted to the possible different modalities of management of the network and/or to the effective state of efficiency of the devices/components used.

The electronic protection unit 51 can be used autonomously or easily integrated on board commonly used protection devices, even if pre-existing and not specifically pre-arranged therefor. This obviously enables containment of the costs of installation and of operative use thereof.

The method 1 can consequently be conveniently used for updating the operating modes of management of a pre-existing electrical network, with much more reduced start-up costs. It is hence possible to upgrade relatively obsolete systems bringing them to high levels of operational management.

The method according to the invention or the corresponding electronic protection unit can find practical implementation according to embodiments that differ from the ones illustrated above. On the basis of the description provided, other characteristics, modifications or improvements are possible and evident to the average person skilled in the sector, on the basis, for example, of available hardware/software resources. Said characteristics, modifications and improvements are hence to be considered as forming part of the present invention.

The invention claimed is:

1. A method (1) for managing a fault event in a network for distributing electrical energy (100), said distribution network comprising at least one voltage source (101) and a load (102), said method comprising:
    performing at least one step (11) of a first procedure for detecting the existence of fault conditions in said load and performing at least one step (15) of a second procedure for determining, on the basis of the evolution in time of the derivative of the instantaneous current in said load, the state of execution of an interruption manoeuvre started by at least one protection device (103, 103A-C) adapted to interrupt the passage of current in said load locally, said second procedure comprising the following steps:
    a") acquiring data (203A) indicating the evolution in time of the derivative of the instantaneous current in said load;
    b") comparing the data acquired in said step a") with a predefined upper threshold value of current derivative TH2, $I2_{103B}$ that is characteristic of said protection device; and
    c") terminating said second procedure and generating an opening-command signal (TC), if the data acquired in said step a") are higher than said upper threshold value, said opening-command signal (TC) operable to trip one of said at least one protection devices.

2. The method according to claim 1, wherein said first procedure comprises at least the following steps:
    a') acquiring data (202, 203) indicating the instantaneous current in said load and the derivative of the instantaneous current in said load;
    b') comparing the data acquired in said step a') with a first predefined set of data (301) indicating at least the instantaneous current and the derivative of the instantaneous current in said load, in normal operating conditions;
    c') generating a trigger signal, if the data acquired in said step a') are not comprised in said first set of data; otherwise,
    d') if the data acquired in said step a') are comprised in said first set of data, then repeat at least the steps a') and b') for further data indicating the instantaneous current in said load and the derivative of the instantaneous current in said load.

3. The method according to claim 1 wherein said second procedure comprises the following steps:
    a") acquiring data (203A) indicating the evolution in time of the derivative of the instantaneous current in said load;
    b") comparing the data acquired in said step a") with predefined lower and upper threshold values of the current derivative (TH1, $I1_{103B}$, TH2, $I2_{103B}$) that are characteristic of said protection device; and
    c") terminating said second procedure and generating an opening-command signal (TC), if the data acquired in said step a") are higher than said upper threshold value; otherwise:

d") terminating said second procedure, if the data acquired in said step a") are lower than said lower threshold value; otherwise e") repeating at least the steps a") and b"), if the data acquired in said step a") are higher than said lower threshold value and are lower than said upper threshold value.

4. The method according to claim 1 wherein said opening-command signal is sent to a further protection device, electrically connected upstream of said protection device.

5. The method according to claim 1 wherein said step of executing said second procedure is preceded by one or more of the following steps:

generating (13) at output an interblock signal, in the case where there exist said fault conditions, said interblock signal operable to inhibit the tripping capacity of said at least one protection device; and/or verifying (14) the presence of possible conditions of interblock; and/or executing a third procedure (12), designed to identify said protection device.

6. The method according to claim 5, wherein said third procedure (12) comprises at least the following steps:

a''') acquiring at least data indicating the instantaneous current in said load and the derivative of the instantaneous current in said load;

b''') comparing the data acquired in said step a''') with one or more second sets of predefined data ($T_{103A}$, $T_{103B}$, $T_{103C}$) indicating the evolution of the instantaneous current and the derivative of the instantaneous current in said load, during the manoeuvre for interruption of the current of said protection device;

c''') identifying said protection device on the basis of the results of the comparison made in said step b''');

d''') selecting, for said protection device identified in said step c'''), a characteristic upper threshold value of current derivative ($I2_{103B}$); and e''') selecting, for said protection device identified in said step c'''), a characteristic lower threshold value of current derivative ($I1_{103B}$).

7. The method according to claim 6, wherein second sets of predefined data comprise one or more mappings of the characteristic curves of electrodynamic repulsion of said at least one protection device.

8. The method according to claim 7, wherein one or more of said mappings comprise one or more characteristic curves, each of which is calculated on the basis of a predefined operating condition.

9. An electronic protection unit (51) for a network for distributing electrical energy, the distribution network comprising at least one voltage source and a load, the electronic protection unit comprising a processing unit (510) operable to execute a method for managing a fault event, the method comprising: performing at least one step of a first procedure for detecting the existence of fault conditions in said load and performing at least one step of a second procedure for determining, on the basis of the evolution in time of the derivative of the instantaneous current in said load, the state of execution of an interruption manoeuvre started by another protection device adapted to interrupt the passage of current in said load locally.

10. The electronic protection unit according to claim 9, further comprising a sensor means (530) for acquiring data corresponding to the instantaneous current in said load and/or to its derivative, said processing unit being further operable to process the signals (5301) received by said sensor means.

11. The electronic protection unit according to claim 9, further comprising a sensor for acquiring data corresponding to the instantaneous current in said load and/or to its derivative, and an electronic circuit for processing the signals received from said sensor means.

12. The electronic protection unit according to claim 9, wherein the electronic protection unit is integrated into a protection device of an Early Fault Detection Prevention (EFDP) type.

13. The electronic protection unit according to claim 9, wherein the electronic protection unit is integrated into a circuit breaker.

14. The electronic protection unit according to claim 9, wherein the electronic protection unit is integrated into a protection device of an Enhanced Early Fault Detection Prevention (EEFDP) type.

15. A network for distributing electrical energy, said distribution network comprising:

at least one voltage source and a load;

a plurality of protection devices, positioned in said distribution network according to a plurality of hierarchical levels;

wherein at least one of said protection devices is a protection device of an Enhanced Early Fault Detection Prevention (EEFDP) type having an electronic protection unit comprising: a processing unit operable to execute a method for managing a fault event, the method comprising: performing at least one step of a first procedure for detecting the existence of fault conditions in said load and performing at least one step of a second procedure for determining, on the basis of the evolution in time of the derivative of the instantaneous current in said load, the state of execution of an interruption manoeuvre started by another protection device adapted to interrupt the passage of current in said load locally.

16. The network of claim 15 wherein said at least one of said protection devices is a protection device of an Early Fault Detection Prevention (EFDP) type.

* * * * *